United States Patent
Garofalo

[19]

[11] Patent Number: 5,810,041
[45] Date of Patent: Sep. 22, 1998

[54] PRESSURE REGULATOR

[75] Inventor: Giovanni Garofalo, Rapallo, Italy

[73] Assignee: HTM Sport S.p.A., Italy

[21] Appl. No.: 851,615

[22] Filed: May 6, 1997

[30] Foreign Application Priority Data

May 16, 1996 [IT] Italy .......................... GE96 A 000043

[51] Int. Cl.⁶ ............................................. F16K 31/126
[52] U.S. Cl. .................................. 137/81.2; 137/505.42; 137/505.37; 251/356; 251/368
[58] Field of Search .................. 137/505.42, 505.37, 137/81.2; 251/368, 356

[56] References Cited

U.S. PATENT DOCUMENTS

| | | |
|---|---|---|
| 2,758,596 | 8/1956 | Cupp . |
| 2,768,643 | 10/1956 | Acomb ............................... 137/505.42 |
| 3,620,251 | 11/1971 | Bowen . |
| 3,920,033 | 11/1975 | Ferrando ............................... 137/81.2 |
| 4,228,821 | 10/1980 | Stark . |
| 4,911,405 | 3/1990 | Weissgerber ........................... 251/368 |
| 5,002,662 | 3/1991 | Ledtje et al. . |
| 5,497,803 | 3/1996 | Ferrante ................................ 137/505.42 |

FOREIGN PATENT DOCUMENTS

| | | |
|---|---|---|
| 509117 | 12/1948 | Canada .............................. 137/505.42 |
| 0531195 A1 | 3/1993 | European Pat. Off. . |
| 1305095 | 11/1961 | France . |

Primary Examiner—A. Michael Chambers
Attorney, Agent, or Firm—Larson & Taylor

[57] ABSTRACT

A pressure regulator for the first reduction stage of a two-stage aqualung. The regulator includes an inlet passage connected to a supply of breathable gases at high pressure; an outlet passage for the gases leading to a second stage regulator; a valve between the inlet passage and the outlet passage; the valve including a valve seat provided with central a through passage and a guided shutoff element; a flexing chamber communicating by one end with the surronding environment and closed at the other end by an impermeable and elastically deformable diaphragm; a rod-like member in contact by one end with the diaphragm and extending with clearance by its other end through the central passage of the valve seat up to the shutoff element. The valve means comprising a planar valve seat, and a shutoff element the portion of which, cooperating with the valve seat, is hemispherical sectioned.

15 Claims, 2 Drawing Sheets

PRESSURE REGULATOR

BACKGROUND OF THE INVENTION

The present invention relates to a two-stage aqualung.

More particularly the present invention relates to a pressure regulator, for the first reduction stage of a two-stage aqualung, of the type comprising a first stage that has a reduction chamber communicating by means of a supply valve with an inlet passage for the air (or for a mixture of breathable gases) at high pressure and with an outlet connected, by means of a connecting passage, to a second reduction stage. The first reduction stage is provided with a flexing chamber for an impermeable and elastically deformable diaphragm which operates the control member of the shutoff element of the supply valve.

Said flexing chamber communicates with the connecting passage leading to the second reducing stage and is sealed off from a chamber communicating with the external environment by the aforementioned diaphragm, which can be subjected to an elastic preloading tending to open the shutoff element of the supply valve, in such a way that the pressure of the external environment and the elastic preloading cause this membrane to flex in the appropriate direction to open the supply valve during inhalation.

The problem which is common to all first stage pressure aqualung regulators, is the highness to the high pressure gases, which may reach also a value of 300 Bar. The said highness is always uncertain, because normally to obtain a gas-tight seal a soft element, consisting of rubber or some similar material, is used cooperating with a rigid element, generally made of metal, with one of the said elements being mobile and being pushed constantly against the fixed element by a spring.

Mostly, as for instance exemplified by the regulator shown in EP 0 531 193 by US Divers, the soft element constitutes the mobile one and the rigid element is a seat having a suitable shape almost always rather sharp.

Other systems, as evidenced for instance by FR 1 305 095 by Normalair, are provided with a conically shaped rigid mobile element which is pushed against a more or less soft seat.

Moreover, check valves are known provided with a movable ball valve element cooperating with a fixed seat element, in which both ball and seat are made of ceramics or the like materials. Said valves however have been used in aqualung pressure regulators. So, for instance, the U.S. Pat. No. 5,002,662 by Ledtje is concerned with such a ball valve, but the said patent relates to a check valve for liquids, and not to a aqualung pressure regulator, that is the said patent is concerned with a technical problem which is completely different from the problem of the present invention, or also the U.S. Pat. No. 4,228,821 by Stark which is concerned with a valve for compressed gases comprising a ball and valve seat both made of hard material such as sapphire or ruby.

Finally, check valves for high-pressure fluids are known, like the one shown in U.S. Pat. No. 3,620,251 by Bowen, according to which there are a mobile and a fixed valve element, both made of metal, in which the fixed element is not a ball.

SUMMARY OF THE INVENTION

In contrast thereto, in the pressure regulator according to the invention the mobile element of the valve is formed by a semisphere (which may be made integral with the mobile element or may be tipped to said element by setting) which may be made of ruby, ceramics or the like hard materials, which cooperates with a valve seat made of a comparatively soft material, like rubber or the like.

The use of ball valve in a balanced, membrane operated, first stage pressure regulator for aqualung is completely new.

The advantages deriving from the use of the regulator according to the invention may be summarized as follows:

All pressure regulators used in underwater breathing apparatuses are subject to a serious problem whenever operating with gases at very high pressure which, as said above, in the most recent apparatuses may reach also the value of 300 Bar.

In fact the sealing systems presently generally employed in said regulators, and exemplified for instance by the regulator according to EP No. 0 531 195, in which there are limited sharp or conical sealing zones cooperating with a soft element, made of rubber or polyurethane or the like materials, are subject to an early wear or also it may easily happens that a small piece of the soft seat is torn off, and this due to the fact that very sharp elements are used to assure a good seal between said elements. Whenever such a small piece is torn off, the high pressured gases mixture passes downstream in a violent way, and as a consequence of this the second stage of the regulator will be subject to the phenomena of self-delivery, which in immersion may be very dangerous since it may also pull the mouth piece from the mouth of the diver.

In the valve of the regulator according to the invention there are no sharp surfaces which may cause the tearing off of the soft element of the valve. This means that the above mentioned phenomena of the violent self-delivery at the second stage of the prior art regulators is completely avoided. It is to be noted that the said phenomena of self-delivery, which in a regulator which is not intended for underwater use may be also considered not serious, in a regulator for underwater use it may be fatal. This means that the regulator according to the invention offers a safety which may be not obtained with the regulators for underwater use of prior art.

These and other objects specified below are achieved by the pressure regulator, for the first reduction stage of a two-stage aqualung, that forms the subject of the present invention, comprising a reduction chamber that communicates, by means of a supply valve comprising a valve seat and a guided shutoff element, with an inlet passage for the air or a mixture of breathable gases at high pressure and with a connecting passage leading to a second reduction stage, said first reduction stage being provided with a flexing chamber for an impermeable and elastically deformable diaphragm operating a cylindrical member that controls the shutoff element of the supply valve, said cylindrical member extending through a communication passage from the chamber to the chamber, which regulator is characterized in that the seat of said supply valve is planar and is made of a relatively soft material, and said shutoff element, which enters the channel of the valve seat, is conical- or hemispherical-sectioned and is made of a hard material.

BRIEF DESCRIPTION OF THE DRAWINGS

These and other features of the pressure regulator, for the first reduction stage of a two-stage aqualung, will be seen more clearly in the following detailed description, in which reference is made to the figures on the attached plates, which show a preferred embodiment and an alternative form, both being non-limiting examples, of the invention, in which.

DESCRIPTION OF THE PREFERRED EMBODIMENTS OF THE INVENTION

Figure 1:
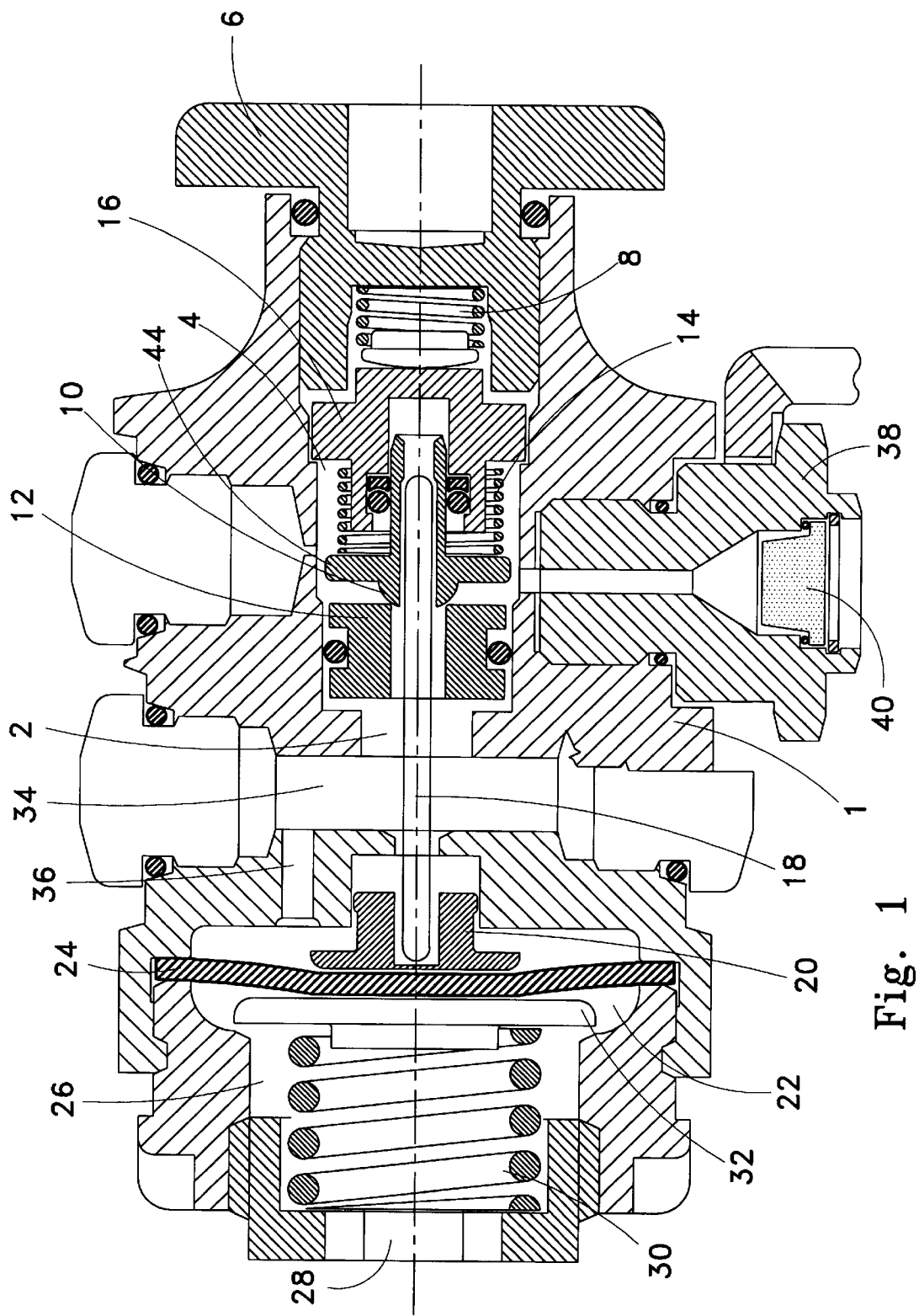
FIG. 1 shows diagrammatically, in cross section, the pressure regulator for the first reduction stage of a two-stage aqualung, forming the subject of the present invention.

With reference to said figures, and in particular to FIG. 1, the first reducing stage, of a two-stage aqualung, forming the subject of the present invention comprises a body 1 in which a reduction chamber 2 is formed. The reduction chamber 2 communicates with an inlet passage 4 whose free end can be sealed tight by a plug 6 with a loading spring 8 that closes the first stage. Between the inlet passage 4 and the reduction chamber 2 is the supply valve comprising the shutoff element 10 in the inlet passage 4 and the valve seat 12 communicating with the inlet passage 4.

The valve shutoff element 10 is elastically preloaded against the valve seat 12 by a spring 14, so that it sits stably in the closed position and is pushed on to the valve seat 12, sealing in the high-pressure air present in the inlet passage 4. The spring 14 is supported on a guide bush 16 and reacts against the plug 6.

The shutoff element 10 is guided so that it can move coaxially in a central guide hole through the guide bush 16 and is supported on a coaxial control rod 18 which in turn is guided so as to be able to move axially through the reduction chamber 2. The other end of the control rod 18 carries a thrust disc 20 that projects into a flexing chamber 22. Said thrust disc 20 is designed to act on an impermeable and elastically flexible diaphragm 24 which separates the flexing chamber 22 from a chamber 26 communicating with the external environment through a hole 28.

Located in the chamber 26 that communicates with the outside environment is a preloading spring 30 acting on the diaphragm 24 and positioned between said membrane and the opposite wall of the chamber 26. Its side facing the diaphragm 24 also carries a thrust disc 32.

The reduction chamber 2 communicates directly with a passage 34 to which is connected a hose leading to the second reduction stage (not shown). Downstream of the passage 34, a passage 36 connects the passage 34 with the flexing chamber 22.

Connected to the abovementioned inlet passage 4 is the mouth 38, fitted with a filter 40, through which the compressed air enters before it is expanded in said first stage.

Figure 2:
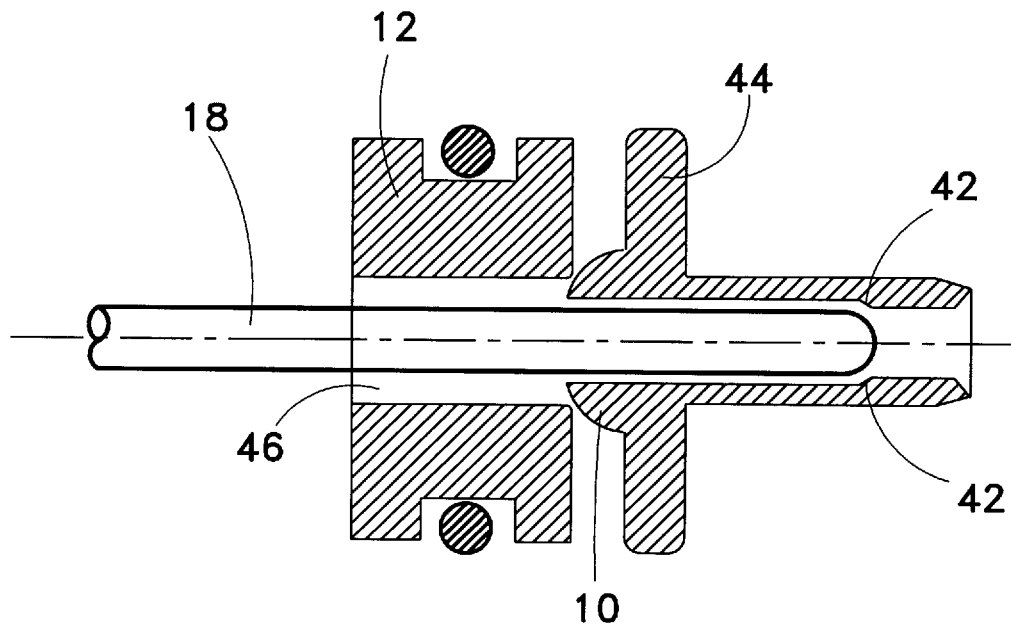
FIG. 2 shows diagrammatically, in cross section, the supply valve in a preferred embodiment of the present invention.
Figure 3:
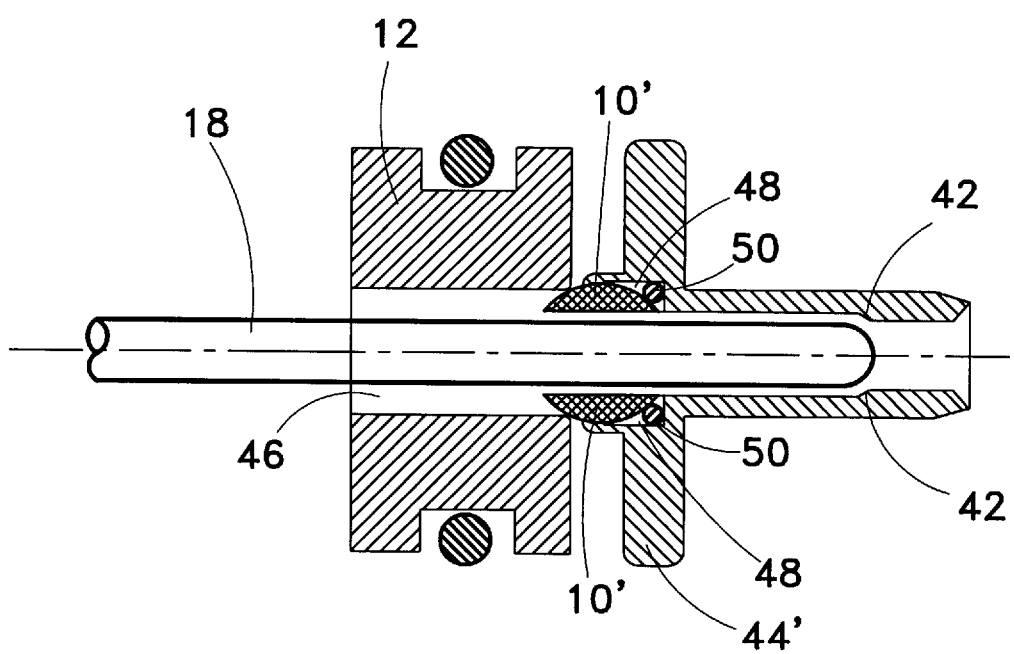
FIG. 3 shows diagrammatically, in the same cross section as FIG. 2, the supply valve in an alternative embodiment of the present invention.

Illustrated in FIGS. 2 and 3 according to the present invention are two embodiments for the supply valve of FIG. 1. In both said embodiments the shutoff element 10, which is bored centrally and longitudinally for the insertion of the control rod 18, is conical- or hemispherical-sectioned and is carried by a coaxial disc 44 having a bored leg through which said control rod passes and having a shoulder 42 for its rear bearing surface. This shutoff element enters a channel 46 present inside the valve seat 12, which is made of a relatively soft material and communicates with the abovementioned inlet passage 4. The mouth of the valve seat 12 is slightly flared to assist the entry into it of the shutoff element 10.

In FIG. 2, an embodiment of the supply valve comprises the shutoff element 10, made of a hard metallic material, made in one piece with said disc 44.

In FIG. 3, another embodiment of the valve has the shutoff element 10' set in a seat 48 in the disc 44' and isolated by the O ring 50. Said shutoff element is made of ruby and is basically spherical or hemispherical.

The shutoff element 10' may advantageously be made of steel, or of a hard stone, such as one of the varieties of corundum or the like, and the valve seat 12 is advantageously made of an engineering polymer, such as teflon, nylon, polyurethane, synthetic rubber or the like.

From the above structural description of the pressure regulator, for the first reduction stage of a two-stage aqualung, forming the subject of the present invention, it will be clear in what way it is to be used: suction applied through the passage 34 creates a pressure drop in the chamber 2; this pressure drop causes the diaphragm 24, and consequently, via the thrust disc 20, the control rod 18 of the supply valve 10, 12, to move. As the shutoff element 10 or 10' moves, it opens the channel 46 of the valve seat 12 allowing air to flow from the mouth 38 through the filter 40 and passage 4 to the chamber 2 and thence to the passage 34, from where the air passes into the second stage (not illustrated). When suction ceases, the spring 14 moves the shutoff element 10 back to the rest position, i.e. back in the passage 46 of the valve seat 12, thereby shutting it off.

The advantages cited earlier will have been made clearer by the foregoing detailed description of the structural and functional characteristics of the pressure regulator, for the first reduction stage of a two-stage aqualung, forming the subject of the present invention.

Thus, the shutoff element is structured in such a way that its spherical or conical head enters the passage of the valve seat. This system avoids leakages of air caused by valve wear because even if the edge of the channel of the valve seat is rounded by wear over time, the sphere or cone will still close the channel completely and therefore ensure leaktightness. The material advantageously used for the sphere is a hard material that ensures that the sphere has the right strength and has an extremely smooth surface. By contrast, the valve seat, being made of a soft material, will ensure a snug fit of the shutoff sphere. This system makes complete closure of the valve possible even if slight eccentricities develop of either the valve seat or the shutoff element.

Furthermore, the spring that ensures the valve is closed by pushing on the shutoff element does not require a large load as in known aqualungs, in which a considerable force is necessary. In the aqualung according to the present invention, this spring has only to keep the surface of the shutoff sphere in contact with the valve seat channel to guarantee complete and reliable closure of the valve.

I claim:

1. A pressure regulator for the first reduction stage of a two-stage aqualung, comprising:

an inlet passage connected to a supply of breathable gases at high pressure;

an outlet passage for said gases leading to a second stage regulator;

valve means between said inlet passage and said outlet passage, said valve means comprising a valve seat provided with a central through passage and a guided shutoff element;

a flexing chamber communicating by one end with the surrounding environment and closed at the other end by an impermeably and elastically deformable diaphragm;

a rod-like member in contact by one end with said diaphragm and extending with clearance by its other end through said central passage of said valve seat up to said shutoff element; and wherein said valve seat is planar, and a portion of said shutoff element cooperating with said valve seat is hemispherical in a cross section taken along a section plane including a longitudinal axis of said rod-like member.

2. A pressure regulator according to claim 1, in which said through passage of said valve seat has a slightly flared mouth.

3. A pressure regulator according to claim 1, in which said valve seat is made of a relatively hard material.

4. A pressure regulator as claimed in claim 3 wherein said valve seat is made of a ceramic material.

5. A pressure regulator according to claim 1, in which said valve seat is made of a relatively soft material.

6. A pressure regulator as claimed in claim 4 wherein said valve seat is made of one of teflon, nylon, polyurethane, or synthetic rubber.

7. A pressure regulator according to claim 1, in which said shutoff element is made of a hard material.

8. A pressure regulator according to claim 7, in which said shutoff element is made of steel or a hard stone.

9. A pressure regulator as claimed in claim 8 wherein said shutoff element is made of corundum.

10. A pressure regulator according to claim 1, in which said shutoff element is bored axially and is carried by a coaxial disc having a bored leg through which said rod-like element passes.

11. A pressure regulator according to claim 10, in which said shutoff element is made in one piece with said disc.

12. A pressure regulator according to claim 10, in which said shutoff element is set in said disc.

13. A pressure regulator according to claim 9, in which said shutoff element is an axially bored hemisphere.

14. A pressure regulator according to claim 12, in which said shutoff element is an axially bored sphere.

15. A pressure regulator according to claim 1, in which said shutoff element is made of ruby.

* * * * *